Jan. 5, 1971     S. WEINBERG     3,552,862

PHOTOGRAPHIC FLASH METER

Filed June 19, 1968

INVENTOR.
STANLEY WEINBERG
BY Lindenberg & Freilich
ATTORNEY

United States Patent Office 3,552,862
Patented Jan. 5, 1971

3,552,862
PHOTOGRAPHIC FLASH METER
Stanley Weinberg, P.O. Box 34647,
Palms, Calif. 90034
Filed June 19, 1968, Ser. No. 738,264
Int. Cl. G01j 1/46, 1/44
U.S. Cl. 356—215                                6 Claims

ABSTRACT OF THE DISCLOSURE

A flash meter with a static display of total light is provided by an integrating capacitor connected across the gate and source of a first junction-type field-effect transistor that drives an ammeter. When power is removed from the transistor, the gate-source junction becomes forward biased to allow the capacitor to discharge. To charge the capacitor to a voltage proportional to the total light of a strobe, a second junction-type field-effect transistor couples the capacitor to a voltage-dividing network comprising a photoconductive cell and a calibrating potentiometer. To test the meter power battery, a switch places the battery across the ammeter and channel of the first transistor in series.

BACKGROUND OF THE INVENTION

(1) Field of the invention

This invention relates to an exposure meter for photography, and more particularly to a flash meter for measuring the total light from a photographic flash gun or speed light and indicating on the face of the meter the lens aperture (f-stop) to be used with film having a given exposure index.

(2) Description of the prior art

Most photographic light meters are designed for operation under static conditions. Such meters cannot be conveniently used with flash guns or speedlights, collectively referred to herein as strobes, since the duration of the light may be anywhere from 1/50 to 1/5000 of a second. First there is the problem of inertia in the moving parts of the meter which, though minimized for the particular application, is significant, particularly with faster strobes. Then there is the problem of reading the light meter if it is allowed to return to zero as the light intensity from the strobe returns to zero.

In the past, complex systems have been provided for measuring strobe light and retaining the measurement on the meter for a period sufficiently long to enable the operator to make an accurate reading. Such systems generally require synchronization of the meter with the strobe in order to connect an integrating capacitor to a photosensitive cell and then effectively switch the capacitor from the cell to a high-input-impedance voltmeter. The switching is done manually by the same switch that triggers the strobe after the strobe switch is closed, but before the strobe light returns to zero. The accuracy of such a system depends upon the consistency with which the manually operated switch is operated to first trigger the strobe and then transfer the capacitor to a voltmeter before the capacitor is able to discharge any of the signal stored therein. If synchronization is not achieved, the meter reading will be some lower value of the total light, depending upon when the strobe is triggered relative to the position of the switch. Any delay in the triggering of the strobe, for example, would result in measuring a lower total or a failure to make any measurement at all, as when the capacitor is already disconnected from the photoconductive cell by the time the strobe is triggered.

OBJECTS AND SUMMARY OF THE INVENTION

An object of this invention is to provide a photographic flash meter which retains an exposure measurement until reset.

Another object of this invention is to provide a flash meter which does not require synchronization with a strobe.

Yet another object of this invention is to provide a flash meter which does not require any moving parts except a meter needle to measure and display total light from a strobe for visual reading.

According to the invention, a flash meter which retains an exposure measurement until reset is provided by a first transistor biased in a non-conductive state through a voltage-dividing network comprising a dark photoresponsive cell and a resistor. An integrating capacitor is so connected to an output of the transistor that when the strobe is flashed, an electrical signal proportional to the total light is stored therein. That stored signal reverse biases a junction in the transistor when the strobe is extinguished, thereby preventing the capacitor from discharging through its charging-current path. In that manner, the transistor and capacitor function as a light signal integrator. The capacitor is connected to a high-input-impedance voltmeter comprising a junction-type field-effect transistor which drives an ammeter. The scale of the ammeter is graduated to read directly in f-stops. Thus, the field-effect transistor holds the ammeter needle in a deflected position proportional to the peak integrated signal stored in the capacitor connected to its gate until its source-drain voltage is removed by an on-off switch, whereupon the gate-source junction becomes a forward biased diode in parallel with the capacitor to discharge it. The resistor in the voltage-dividing network is a variable resistor through which calibration of the meter is adjusted for film or different speeds (exposure indices). To test a power battery provided for the meter, a third position of the switch closes a circuit of the battery in series with the ammeter and the source-drain channel of the field-effect transistor.

These and other objects of the invention will become apparent from the following description with reference to the drawings. The novel features of the invention are set forth with particularity in the appended claims. The invention and all of its advantages will best be understood from the following description when read in conjunction with the drawings.

DESCRIPTION OF THE PREFERRED EMBODIMENTS

Figure 1:
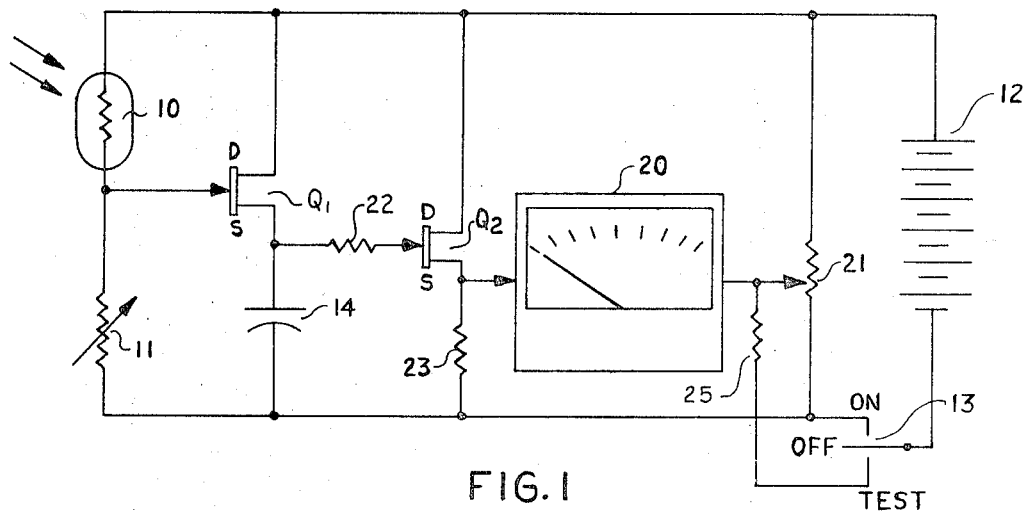
FIG. 1 is a schematic diagram of a preferred embodiment of the invention.

In a preferred embodiment of the invention shown in FIG. 1, a first transistor $Q_1$ is biased in a non-conductive state by a photoconductive cell 10 and a scaling resistor 11 connected across a battery 12 by a switch 13 when ON (in its upper position as viewed in FIG. 1). The transistor $Q_1$ is preferably a silicon n-channel field-effect transistor of the junction type having its drain connected directly to the positive pole of the battery 12, its gate connected to the junction between the photoconductive cell 10 and the resistor 11, and its source connected to the negative pole of the battery 12 (via switch 13) by a capacitor 14. However, it should be understood that transistor $Q_1$ may be an NPN transistor with the emitter, base and collector thereof connected as the source, gate and drain of the field-effect transistor. Its operation would then be essentially the same as the field-effect transistor which is biased at pinch-off (cut off for the NPN transistor) due to the high negative gate voltage $V_{GS}$ provided by the voltage-dividing network consisting of the photoconductive cell 10 and the resistor 11 since the photoconductive cell 10 has a very high dark resistance (in the order of at least 800 megohms as compared to the calibrating resistor variable between 0 and 3.5 kilohms).

The transistor $Q_1$ may also be a field-effect transistor of the insulated gate type, or any other type of electronic valve. Thus, when the meter is turned on through the switch 13, the transistor $Q_1$ will normally be non-conductive, even in the presence of the ambient light conditions under which strobes are normally used.

The photoconductive cell 10 is preferably a cadmium sulfide cell which has a range of response to light substantially equal to the visible spectrum of 4000 to 7000 angstroms. When a strobe is triggered, light therefrom produces a photoconductive effect in the cell 10, thereby decreasing its resistance in proportion to the intensity of the light received. In that manner, the bias on the gate of the transistor $Q_1$ is moved above the pinch-off voltage to allow source-drain current to flow in proportion to the intensity of the light received by the cell 10. The source-drain current charges the capacitor 14, thereby providing a voltage signal proportional to the total light received by the cell 10 which is the sum of the ambient light and the intensity of the strobe light. As the light intensity passes its peak, the gate voltage drops below the voltage stored in the capacitor. With high gate voltage $V_{GS}$ restored, the transistor $Q_1$ is again biased at pinch-off.

While the transistor $Q_1$ is being driven from peak conduction to pinch-off by the response of the cell 10 to receding light from the strobe, the peak positive charge stored in the capacitor 14 will not discharge through transistor $Q_1$ because the PN junction between the gate and the source is reverse biased, and the drain is positive with respect to the source. The only discharge path for the capacitor 14 is a high input impedance voltmeter comprising a silicon n-channel field-effect transistor $Q_2$ of the junction type and ammeter 20 having one terminal of its coil connected to the source of the transistor $Q_2$ and the other terminal connected to a potentiometer 21 connected in parallel with the battery 12 (via switch 13 in the ON position). The potentiometer 21 is adjusted to zero the position of the ammeter 20 while the capacitor 14 is discharged and the switch 13 is in the ON position.

The gate of transistor $Q_2$ is connected to the capacitor 14 through a large resistor 22 (in the order of 150 kilohms to further increase the input impedance of the voltmeter). Transistor $Q_2$ then conducts current in proportion to the voltage signal stored in the capacitor 14 without discharging it.

Figure 2:
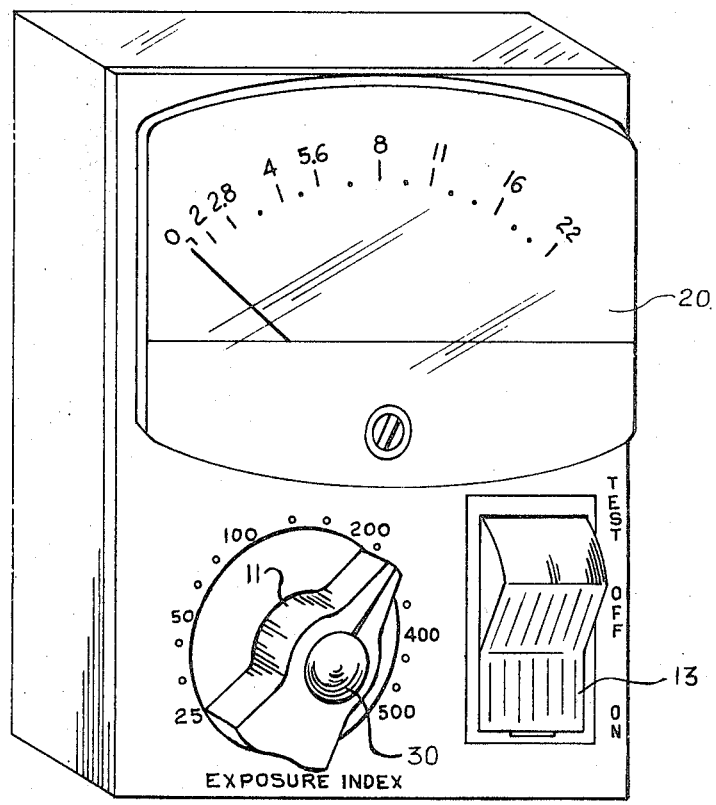
FIG. 2 is a front view of the preferred embodiment of FIG. 1 assembled for use.

An output signal from the field-effect transistor $Q_2$ is taken across a resistor 23 connected between its source and the negative pole of battery 12 through the switch 13 in its ON position. Since that output signal is directly proportional to the voltage stored in the capacitor 14, the current through the ammeter 20 is proportional to the total light received by the photoconductive cell 10. In that manner, the needle of the ammeter 20 is deflected in proportion to the light produced by the strobe. The scale of the ammeter is graduated directly in $f$-stop numbers from 0 to 22 as shown in FIG. 2 to be used for film having a given index.

Scaling for the film exposure index is accomplished by adjustment of the variable resistor 11. The adjustable range of the resistor 11 is calibrated in terms of exposure indices for various films from, for example, 25 to 500 as shown in FIG. 2. As the exposure index setting is increased to an index of higher film speed, the resistance of the resistor 11 is increased thereby effectively increasing the voltage stored in the capacitor 14 for a given total of light impinging on the cell 10 mounted behind a white translucent dome 30. That in turn increases the current through the ammeter 20 to deflect the needle thereof to a higher $f$-stop. Thus, the faster the film speed, the higher the $f$-stop indicated for a given strobe-light cycle.

Once the operator has read the $f$-stop from the strobe-light meter, the switch 13 is moved from its ON to its OFF position, a position which is intermediate the ON position and a TEST position. To facilitate operating the switch 13 between ON, OFF and TEST, a rocking-type switch employed of the type illustrated in FIG. 2.

In the OFF position, the switch 13 is open thereby disconnecting the negative terminal of the battery 12 from the circuit shown in FIG. 1. Under those conditions, the field-effect transistor $Q_2$ no longer has a drain-source voltage applied thereto to provide a current through the n-channel thereof. Accordingly, the transistor $Q_2$ ceases to operate as a field-effect transistor. However, the PN junction between the gate and the source of the transistor $Q_2$ then becomes forward biased since the capacitor 14 is charged with a positive signal on the gate. Current then flows through resistors 22 and 23 to discharge the capacitor 14. In that manner, the meter is reset when the switch 13 is placed in its off position. For a subsequent strobe-light measurement, the switch 13 is simply moved to the ON position at any time before the strobe is asynchronously triggered.

The TEST position for the switch 13 is provided in order to be able to check the condition of the battery 12. Thus, in the TEST position, the switch 13 connects the negative terminal of the battery 12 to the sliding contact of the potentiometer 21 through a resistor 25. Current then flows from the battery 12 through the n-channel of the transistor $Q_2$, the ammeter 20 and resistor 25. Sufficient current for full scale deflection of the needle is required for reliable and accurate operation of the strobe-light meter.

Although a particular embodiment of the invention has been described and illustrated herein, it is recognized that modifications and variations may readily occur to those skilled in the art and consequently it is intended that the claims be interpreted to cover such modifications and equivalents.

What is claimed is:

1. A photographic flash meter comprising:
    a series circuit comprised of a photoresponsive element and a first resistor in series for producing a signal proportionate to the intensity of light incident on said element when a voltage is applied across said circuit;
    a capacitor having one terminal connected to an end of said first resistor remote from said photoresponsive element;
    unilateral conductive means coupling a junction between said photoresponsive element and said first resistor to a terminal of said capacitor opposite said one terminal for intergrating said signal;
    a field-effect transistor of the junction type and a second resistor, said field-effect transistor having a source electrode connected to said capacitor at said one terminal through said second resistor, a drain electrode connected to said photoresponsive element at a terminal remote from said first resistor, and a gate electrode coupled to said capacitor at said terminal of said capacitor opposite said one terminal;
    a voltage dividing circuit having first and second end terminals connected respectively to said drain electrode and to said second resistor at one end remote from said source electrode, said voltage dividing circuit having a third terminal between said first and second terminals to provide a reference voltage between voltages at said first and second terminals when a voltage is applied across said first and second terminals;
    indicating means connected between said source electrode and said third terminal of said voltage dividing circuit for visually displaying a numerical quantity which bears a relation to light incident on said element as a function of charge stored in said capacitor after a photographic flash;

a battery; and means for connecting and disconnecting said battery across said series circuit and said voltage dividing circuit whereby when said battery is connected, said capacitor integrates said signal and said indicating means displays said quantity, and thereafter when said battery is disconnected, said capacitor discharges stored energy through said gate and source electrodes of said field-effect transistor.

2. A photographic flash meter as defined in claim 1 wherein said indicating means is a meter having a needle deflected in proportion to the difference in voltage between said signal and said reference voltage and said means for connecting said battery has a third test position to connect said battery between said third terminal and one of said first and second end terminals of said voltage dividing circuit to cause said indicating means to visually display a numerical quantity which bears a relation to the stored energy of said battery.

3. A photographic flash meter as defined in claim 2 wherein said voltage dividing circuit comprises a potentiometer for zeroing said meter while said capacitor is discharged.

4. A photographic flash meter as defined in claim 3 wherein the resistance of said first resistor in series with said photoresponsive element is variable for scaling calibrations of said meter.

5. A photographic flash meter comprising:

a photoresponsive element and a first resistor in series for connection between opposite poles of a power supply for producing a signal proportionate to the intensity of light incident on said element;

a capacitor having one terminal connected to an end of said first resistor remote from said photoresponsive element;

a transistor having first and second series conducting terminals and a terminal for controlling the amplitude of conduction between said first and second terminals as a function of a voltage signal applied to said control terminal, said control terminal being connected to a junction between said photoresponsive element and said first resistor, said first terminal being connected in series with said capacitor and said second terminal being connected to said photoresistive element at an end thereof remote from said junction;

indicating means having a high input impedance connected to said capacitor for visually displaying a numerical quantity which bears a relation to light incident on said element as a function of charge stored in said capacitor after a photographic flash; and reset means for selectively discharging said capacitor.

6. A photographic flash meter as defined in claim 5 wherein said transistor is a field-effect transistor, said first terminal is a source electrode, said second terminal is a drain electrode, and said control terminal is a gate electrode.

References Cited

UNITED STATES PATENTS

| | | | |
|---|---|---|---|
| 2,521,890 | 9/1950 | Alexander | 356—215X |
| 3,147,680 | 9/1964 | Stimson | 356—226X |
| 3,418,479 | 12/1968 | Schmitt | 356—215X |
| 3,445,170 | 5/1969 | Dietrich et al. | 356—226 |
| 3,464,773 | 9/1969 | Waz | 356—215 |

FOREIGN PATENTS

| | | | |
|---|---|---|---|
| 1,143,904 | 10/1957 | France | 356—215 |

RONALD L. WIBERT, Primary Examiner

W. A. SKLAR, Assistant Examiner

U.S. Cl. X.R.

95—10; 250—206; 356—226.